US011172299B2

(12) United States Patent
Torgerson et al.

(10) Patent No.: US 11,172,299 B2
(45) Date of Patent: Nov. 9, 2021

(54) CONTENT RULES ENGINES FOR AUDIO PLAYBACK DEVICES

(71) Applicant: Sonos, Inc., Santa Barbara, CA (US)

(72) Inventors: Jeffrey Michael Torgerson, Stanwood, WA (US); Sanford William Spivey, Santa Barbara, CA (US); Ryan Taylor, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/948,347

(22) Filed: Sep. 14, 2020

(65) Prior Publication Data
US 2020/0413192 A1 Dec. 31, 2020

Related U.S. Application Data

(63) Continuation of application No. 16/536,053, filed on Aug. 8, 2019, now Pat. No. 10,785,570, which is a (Continued)

(51) Int. Cl.
*H04R 3/12* (2006.01)
*H04R 27/00* (2006.01)
(Continued)

(52) U.S. Cl.
CPC ............ *H04R 3/12* (2013.01); *G06F 3/165* (2013.01); *H04L 12/282* (2013.01); *H04R 27/00* (2013.01);
(Continued)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Kenny H Truong
(74) *Attorney, Agent, or Firm* — Fortem IP LLP; Matt Lincicum

(57) ABSTRACT

Content rules engines for playback devices are disclosed herein. A media playback system receives a first command to form a synchrony group comprising a plurality of playback devices. The system receives a second command for the synchrony group to play back first audio content. In response to the second command, the first audio content is played back via the synchrony group. The system receives (i) second audio content to be played back by one or more of the playback devices of the synchrony group and (ii) content source properties associated with an audio source of the second audio content. The system accesses a rules engine to determine playback restrictions based at least in part on the content source properties. Based at least in part on the playback restrictions, operation of one or more of the playback devices is restricted.

20 Claims, 12 Drawing Sheets

Related U.S. Application Data continuation of application No. 16/008,740, filed on Jun. 14, 2018, now Pat. No. 10,433,058.

(51) Int. Cl.
*H04L 12/28* (2006.01)
*G06F 3/16* (2006.01)

(52) U.S. Cl.
CPC .......................... *H04L 2012/2849* (2013.01); *H04R 2227/003* (2013.01); *H04R 2227/005* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,686,606 | B2 | 6/2017 | Millington et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2010/0299639 | A1* | 11/2010 | Ramsay .................. H04R 27/00 715/835 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
First Action Interview Office Action dated Jan. 30, 2019, issued in connection with U.S. Appl. No. 16/008,740, filed Jun. 14, 2018, 4 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 9, 2020, issued in connection with U.S. Appl. No. 16/536,053, filed Aug. 8, 2019, 5 pages.
Notice of Allowance dated May 14, 2019, issued in connection with U.S. Appl. No. 16/008,740, filed Jun. 14, 2018, 7 pages.
Notice of Allowance dated May 20, 2020, issued in connection with U.S. Appl. No. 16/536,053, filed Aug. 3, 2019, 8 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Content Source Properties | Playback Restrictions |
|---|---|
| - Input type: live audio<br>- Latency less than 25 ms<br>- Encoding type: HTTP Live Streaming (HLS) | - Maximum grouping of playback devices: 3<br>- Limit playback to devices with dedicated 5 GHz radio<br>- Limit playback to devices that are HLS-compatible |

*Figure 6A*

| Playback Device | State |
|---|---|
| Playback Device 1 | Playback permitted;<br>Maximum devices grouped: 3 |
| Playback Device 2 | Restricted – playback not permitted |
| Playback Device 3 | Playback permitted;<br>Maximum devices grouped: 3 |
| Playback Device 4 | Playback permitted;<br>Maximum devices grouped: 3 |
| Playback Device 5 | Restricted – playback not permitted |
| Playback Device 6 | Restricted – playback not permitted |

*Figure 6B*

| Content Source Properties | Playback Restrictions |
|---|---|
| - Explicit content tag | - Do not permit play back on devices located in "kid's room" |

Figure 7A

| Playback Device | State |
|---|---|
| Playback Device 1 | Restricted – playback not permitted |
| Playback Device 2 | Playback permitted |
| Playback Device 3 | Playback permitted |
| Playback Device 4 | Playback permitted |

Figure 7B

| Content Source Properties | Playback Restrictions |
|---|---|
| - Input type: doorbell | - Do permit playback in devices located in "bedroom"<br>- Do not permit playback between 10 pm and 6 am |

*Figure 8A*

| Playback Device | State |
|---|---|
| Playback Device 1 | Restricted – playback not permitted |
| Playback Device 2 | Restricted – playback not permitted |
| Playback Device 3 | Playback permitted between 10 pm and 6 am |
| Playback Device 4 | Playback permitted between 10 pm and 6 am |

*Figure 8B*

| Content Source Properties | Playback Restrictions |
|---|---|
| - Input type: VR home theatre | - Limit playback to devices with wired LAN connection<br>- Maximum grouping of playback devices: 4 |

*Figure 9A*

| Playback Device | State |
|---|---|
| Playback Device 1 | Playback permitted;<br>Maximum devices grouped: 4 |
| Playback Device 2 | Playback permitted;<br>Maximum devices grouped: 4 |
| Playback Device 3 | Playback permitted;<br>Maximum devices grouped: 4 |
| Playback Device 4 | Playback permitted;<br>Maximum devices grouped: 4 |
| Playback Device 5 | Restricted – playback not permitted |
| Playback Device 6 | Restricted – playback not permitted |

*Figure 9B*

CONTENT RULES ENGINES FOR AUDIO PLAYBACK DEVICES

CROSS-REFERENCE TO RELATED APPLICATION

This application is a continuation of U.S. patent application Ser. No. 16/536,053, filed Aug. 8, 2019, which is a continuation of U.S. patent application Ser. No. 16/008,740, filed Jun. 14, 2018, now U.S. Pat. No. 10,433,058, each of which is incorporated herein by reference in its entirety.

FIELD OF THE DISCLOSURE

The disclosure is related to consumer goods and, more particularly, to methods, systems, products, features, services, and other elements directed to content rules engines for audio playback devices or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 6A-9B illustrate various example playback restrictions and corresponding state tables.

Figure 1:
FIG. 1 shows a media playback system in which certain embodiments may be practiced.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Media playback systems can include many different playback devices capable of playing back audio from a variety of different sources. For example, audio content can be delivered to playback devices over a physical line-in connections (e.g., 3.5 mm audio cable) or over a network (e.g., LAN or WAN), and the content can vary in type and character, for example ranging from home theatre surround-sound audio to streaming audiobooks to live input from a musical instrument. The wide variety of potential content creates certain challenges, as different audio content and different sources may have different requirements for playback devices. For example, "live" audio such as that being output from a musical instrument may require playback with very low latency. In this instance, it may be desirable to limit playback of such live audio content to playback devices that are capable of meeting the low-latency requirements. Similarly, surround-sound audio (e.g., DOLBY® Atmos) may require playback on devices having a dedicated 5 GHz radio or a LAN connection to provide satisfactory performance for a home-theatre experience. In this case, it may be desirable to preclude playback of surround-sound audio on any playback devices that do not have either a dedicated 5 GHz radio or a LAN connection.

In some embodiments of the technology, a content rules engine employs a variety of rules that restrict playback of audio content depending on the associated content source properties. Examples of content source properties include: input source (e.g., SPOTIFY®, a guitar, a television, data received over a 5G data connection), input type (e.g., buffered audio, live audio, doorbell, smoke alarm, VR home theatre, etc.), encoding format (e.g., HTTP Live Stream (HLS), MP3, etc.), bitrate, and user-specific tags (e.g., a user's account is tagged as a Metallica fan). Examples of playback device characteristics include hardware components (e.g., on-board radio, processing power, device model, transducers, etc.), device configuration (e.g., firmware version, grouping status (e.g., bonded or merged with other devices), device location, network connection (ethernet vs. wireless), etc.), time of day, etc. Based on one or more of such content source properties associated with requested audio content, the content rules engine can restrict playback depending on characteristics of particular playback devices. This restriction can take a variety of forms, for example, precluding playback on a given device, limiting the total number of playback devices that can be grouped together to play back the requested audio content, precluding formation of a synchrony group that includes particular playback devices.

In some embodiments, the content rules engine can support a wide variety of different rules that limit playback on certain playback devices based on both the content source properties of the requested audio content and the characteristics of the playback devices. In various embodiments, the rules of the content engine can be specified by a playback device manufacturer, by an end user, by an audio content provider, or by another party.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

Additionally, the home environment can include external local devices 109, for example, a piano 109a, a guitar 109b, and a television 109c. Other examples of external local devices include radios, media players (e.g., Blu-Ray players, DVD players, CD players, etc.), third-party speakers, etc. As described in more detail below, these external local devices 109 can provide input to one or more of the playback devices 102 which can then play back audio based on the input from the external local device(s) 109. For example, the piano 109a can be coupled to playback devices 102f and 102g in Nick's room, such that an audio signal from the piano 109a is played back via the playback devices 102f and 102g. The guitar 109b can be coupled to playback device 102d in the Office, such that audio signal from the guitar 109b is played back via the playback device 102d. The television 109c in the living room can be coupled to playback devices 102a, 102b, 102j, and 102k, which during operation can provide surround-sound based on an audio signal received from the television 109c. The external local devices 109 can be coupled to one or more playback devices 102 via a direct hardwired connection (e.g., auxiliary input to a playback device) or via a network connection (e.g., LAN via router 106 or the WAN 107).

The various playback, network microphone, and controller devices 102-104 and/or other network or external local devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a first VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output compared to a playback device).

In use, a network microphone device may receive and process voice inputs from a user in its vicinity. For example, a network microphone device may capture a voice input upon detection of the user speaking the input. In the illustrated example, the NMD 103a of the playback device 102a in the Living Room may capture the voice input of a user in its vicinity. In some instances, other network microphone devices (e.g., the NMDs 103b and 103f) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In some embodiments, a network microphone device may process captured voice input and transmit the processed voice input to one or more remote computing devices associated with a voice assistant service (VAS) for further processing. Additional details regarding the interplay of an NMD, one or more VASes, and one or more media services to respond to voice inputs and provide requested content can be found, for example, in U.S. patent application Ser. No. 15/721,141, filed Sep. 29, 2017, which is hereby incorporated by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

By way of illustration, SONOS, Inc. presently offers (or has offered) for sale certain playback devices including a "PLAY:1," "SONOS ONE" "PLAY:3," "PLAY:5," "PLAYBAR," "PLAYBASE," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the examples shown and described herein or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

Figure 2A:
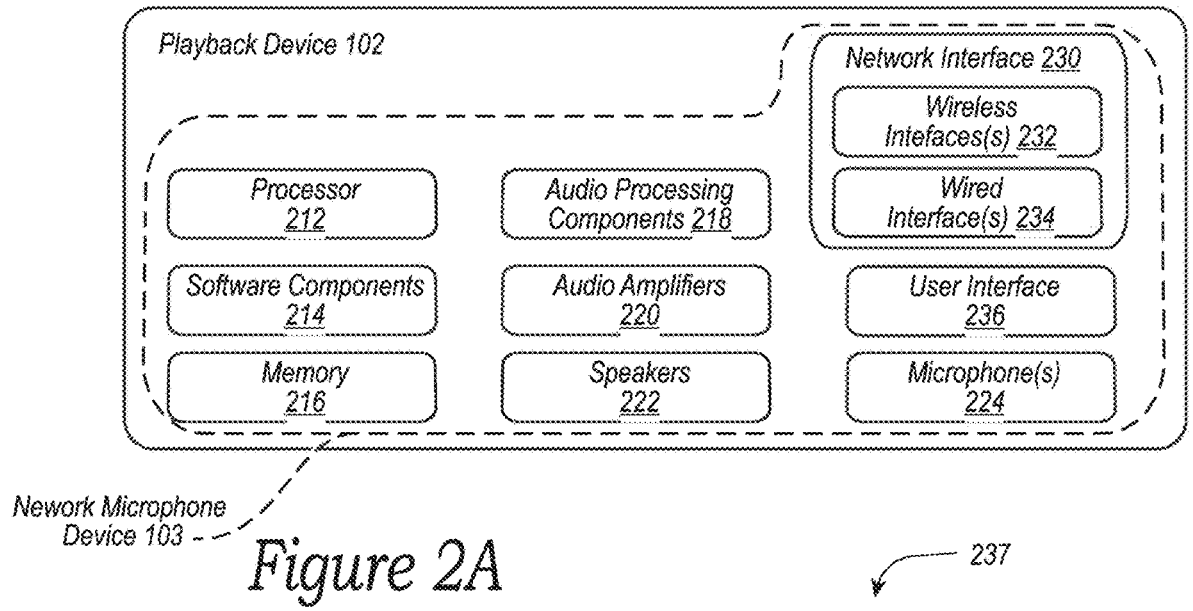
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 220, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may include or otherwise involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230. For example, audio content can be received (either via a hardwired line-in connection or via the network interface 230) from one or more of the local external devices 109 (FIG. 1). Such local external devices can include, for example, musical instruments, televisions, radios, media players (e.g., Blu-Ray players, DVD players, CD players, etc.), third-party speakers, etc.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. But in some embodiments, a playback device may contain the same or similar far-field microphones and/or voice processing components as a network microphone device. In another example, a network microphone device may include a touch-sensitive button for enabling/disabling a microphone.

Figure 2B:
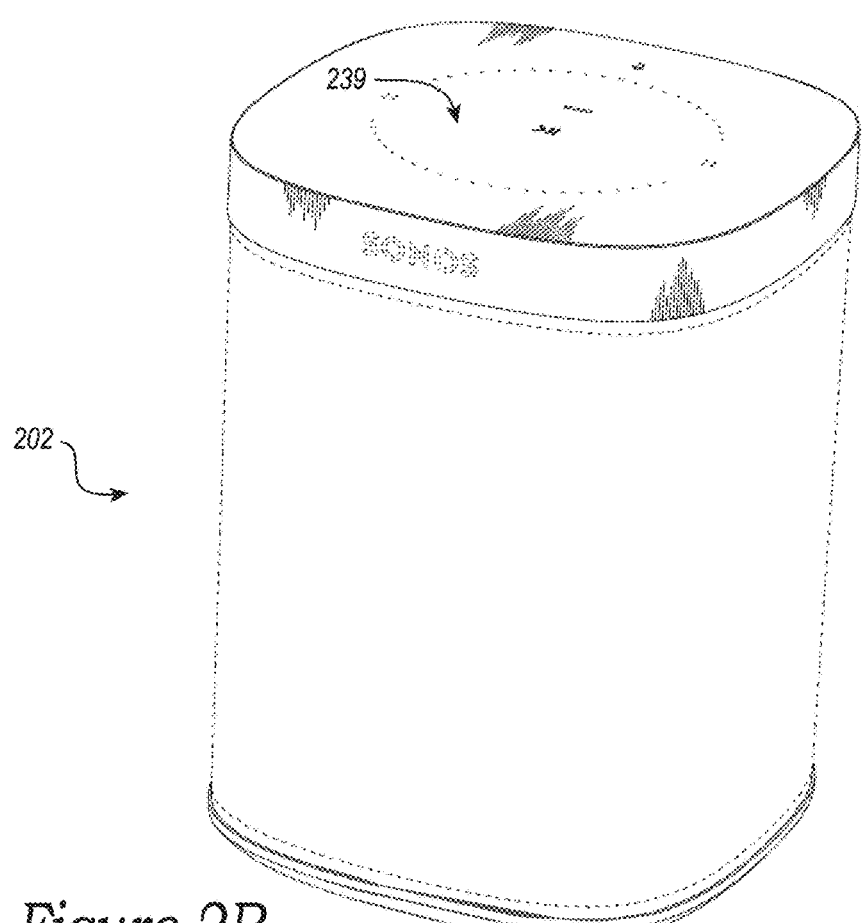
FIG. 2B is an isometric diagram of an example playback device that includes a network microphone device.

FIG. 2B is an isometric diagram showing an example playback device 202 incorporating a network microphone device (NMD). The playback device 202 has an upper portion 237 at the top of the device comprising a plurality of ports, holes, or apertures 227 in the upper portion 237 that allow sound to pass through to one or more individual microphones 224 positioned within the device 202. For example, a plurality of microphones 224 can be arranged in an array configured to receive sound via the apertures 227 and produce electrical signals based on the received sound.

b. Example Playback Device Configurations

Figure 3A:
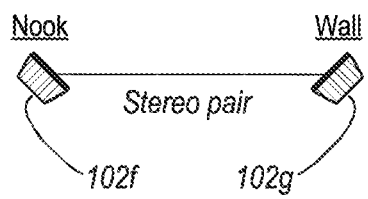
FIGS. 3A, 3B, 3C, 3D, and 3E are diagrams showing example zones and zone groups in accordance with aspects of the disclosure.
Figure 3B:
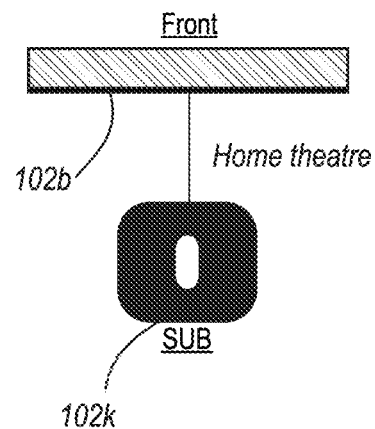
Figure 3C:
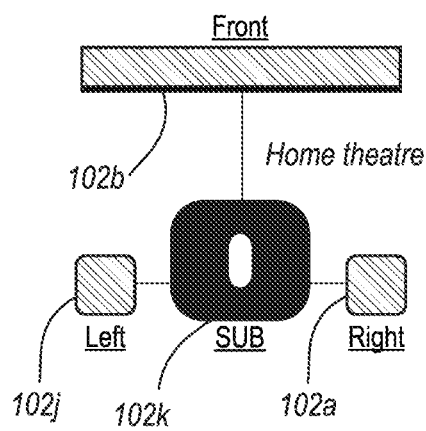
Figure 3D:
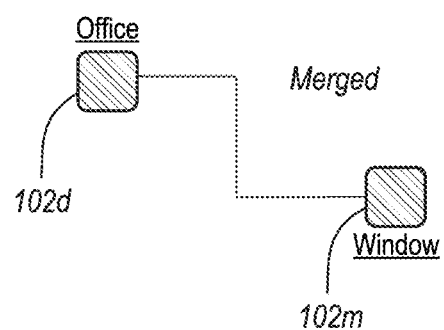
Figure 3E:
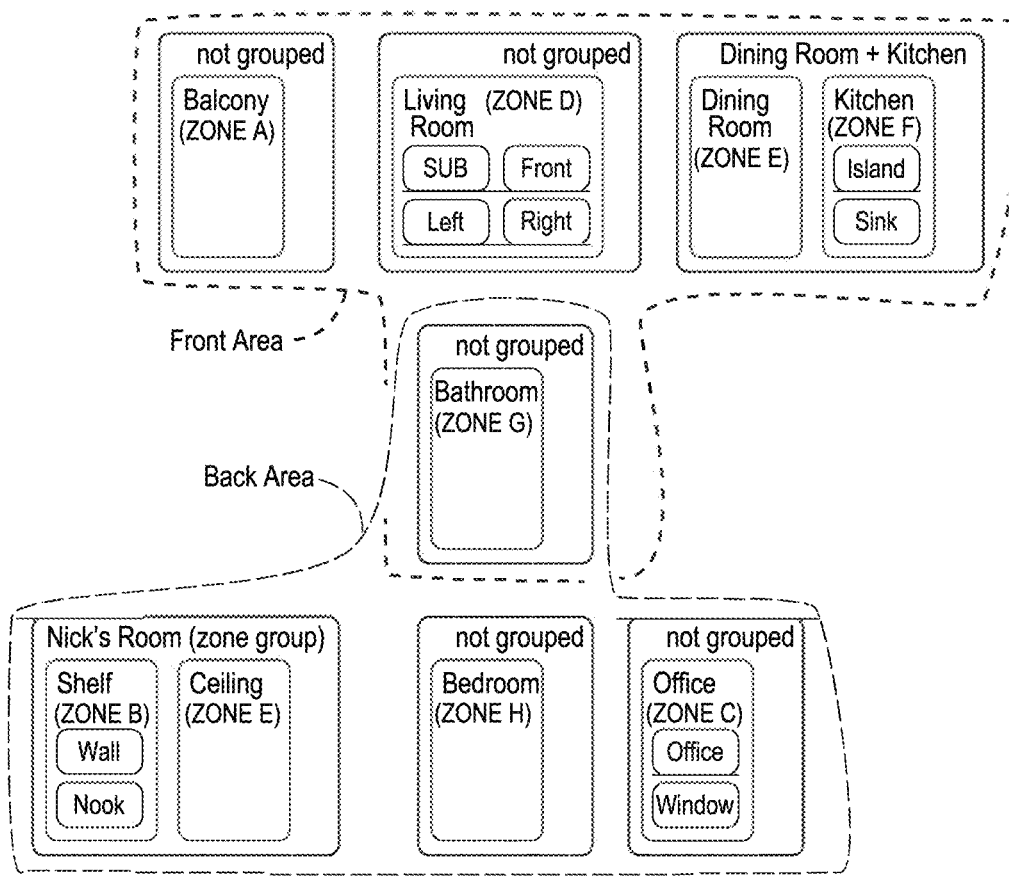

FIGS. 3A-3E show example configurations of playback devices in zones and zone groups. Referring first to FIG. 3E, in one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When un-bonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D (FIG. 3E).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102*i* Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3E, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3E. In some embodiments, a zone group may be given a unique name selected by a user, such as Nick's Room, as also shown in FIG. 3E.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the media playback system 100 may store and use variables or identifiers representing other associations of zones and zone groups, such as identifiers associated with Areas, as shown in FIG. 3. An area may involve a cluster of zone groups and/or zones not within a zone group. For instance, FIG. 3E shows a first area named Front Area and a second area named Back Area. The Front Area includes zones and zone groups of the Balcony, Living Room, Dining Room, Kitchen, and Bathroom. The Back Area includes zones and zone groups of the Bathroom, Nick's Room, the Bedroom, and the Office. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682, 506 filed Aug. 21, 2017 and titled "Room Association Based on Name," and U.S. Pat. No. 8,483,853 filed Sep. 11, 2007, and titled "Controlling and manipulating groupings in a multi-zone media system." U.S. application Ser. No. 15/682, 506 and U.S. Pat. No. 8,483,853 are both incorporated herein by reference in their entirety. In some embodiments, the media playback system 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In some embodiments, the memory 216 is configured to store a set of command data for selecting a particular VAS, such as the VAS 160, when processing voice inputs.

The memory 216 can also store data regarding the particular playback device 102, including, for example, hardware characteristics (e.g., type of wireless radio), device capabilities (e.g., supported encoding formats), location of the playback device, or other device characteristics. As described in more detail below, during operation playback may be restricted on one or more of the playback devices based in part on such device characteristics. For example, a playback device that cannot support HTTP Live Stream (HLS) encoding format may be precluded from forming a synchrony group with other playback device(s) when the audio content to be played back is encoded with HLS.

During operation, one or more playback zones in the environment of FIG. 1 may each be playing different audio content. For instance, the user may be grilling in the Balcony zone and listening to hip hop music being played by the playback device 102*c* while another user may be preparing food in the Kitchen zone and listening to classical music being played by the playback device 102*i*. In another example, a playback zone may play the same audio content in synchrony with another playback zone. For instance, the user may be in the Office zone where the playback device 102*d* is playing the same hip-hop music that is being playing by playback device 102*c* in the Balcony zone. In such a case, playback devices 102*c* and 102*d* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102*c* from the Balcony zone to the Office zone, the Office zone may now include both the playback devices 102*c* and 102*d*. In some cases, the use may pair or group the moved playback device 102*c* with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Living Room zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103a or 103b to control the Living Room zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the media playback system 100.

c. Example Controller Devices

Figure 4:
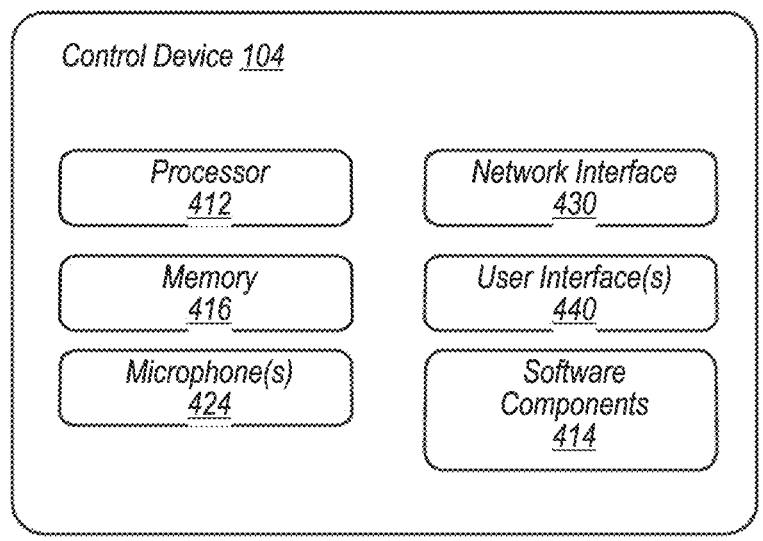
FIG. 4 is a functional block diagram of an example controller device in accordance with aspects of the disclosure.

FIG. 4 is a functional block diagram illustrating certain aspects of a selected one of the controller devices 104 of the media playback system 100 of FIG. 1. Such controller devices may also be referred to as a controller. The controller device shown in FIG. 4 may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4A, 4B:
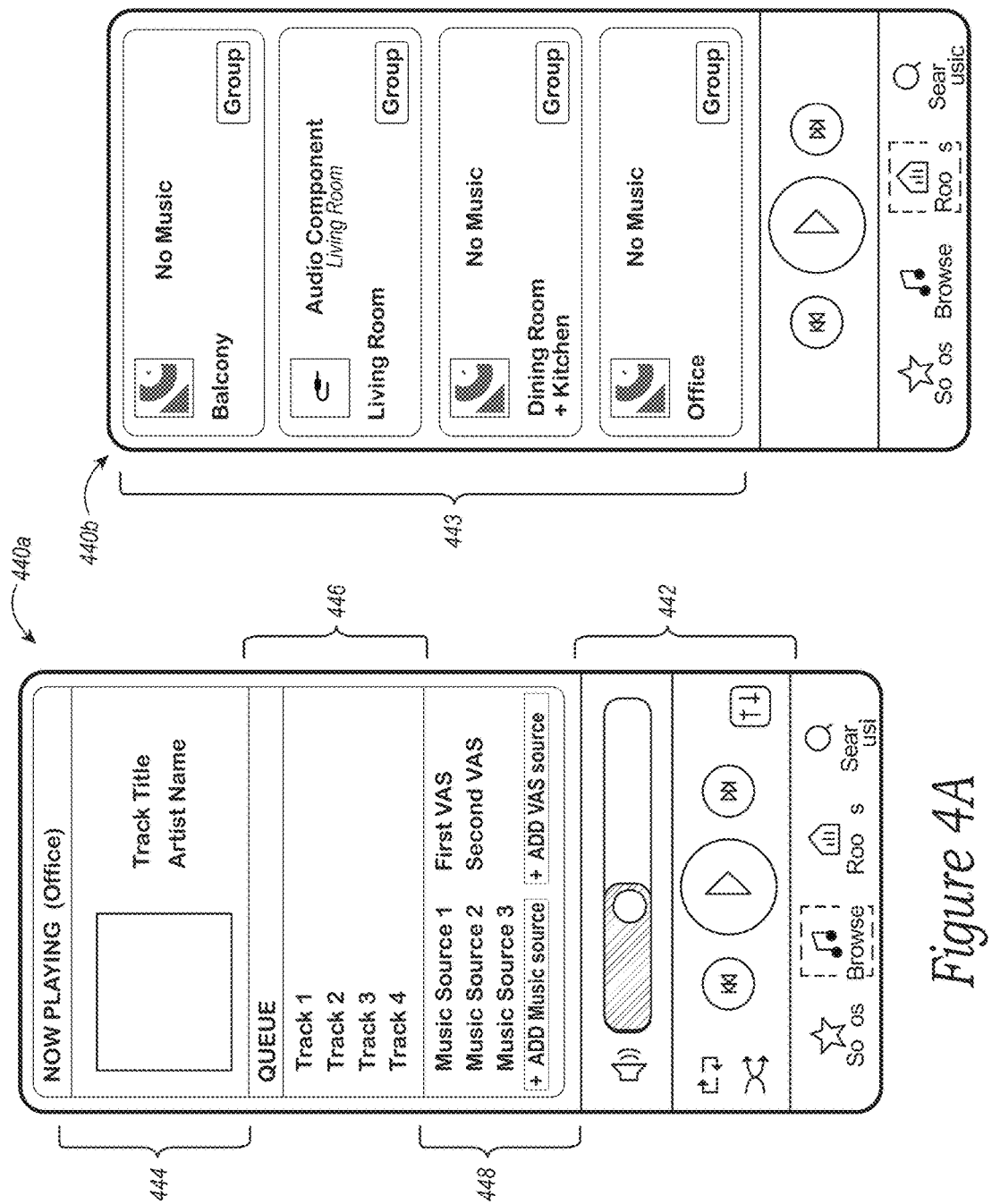
FIGS. 4A and 4B are controller interfaces in accordance with aspects of the disclosure.

The user interface(s) 440 of a controller device may be configured to facilitate user access and control of the media playback system 100, by providing controller interface(s) such as the controller interfaces 440a and 440b shown in FIGS. 4A and 4B, respectively, which may be referred to collectively as the controller interface 440. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. The playback zones regions may also include representation of zone groups, such as the Dining Room+ Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices. For example, a user may assign the first VAS 160 to one or both of the NMDs 102a and 102b in the Living Room shown in FIG. 1, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices. In some embodiments, audio content can be received (either via a hardwired line-in connection or via a network interface) from one or more of the local external devices 109 (FIG. 1). Such local external devices can include, for example, musical instruments, televisions, radios, media players (e.g., Blu-Ray players, DVD players, CD players, etc.), third-party speakers, etc.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network and Remote Computing Systems

Figure 5:
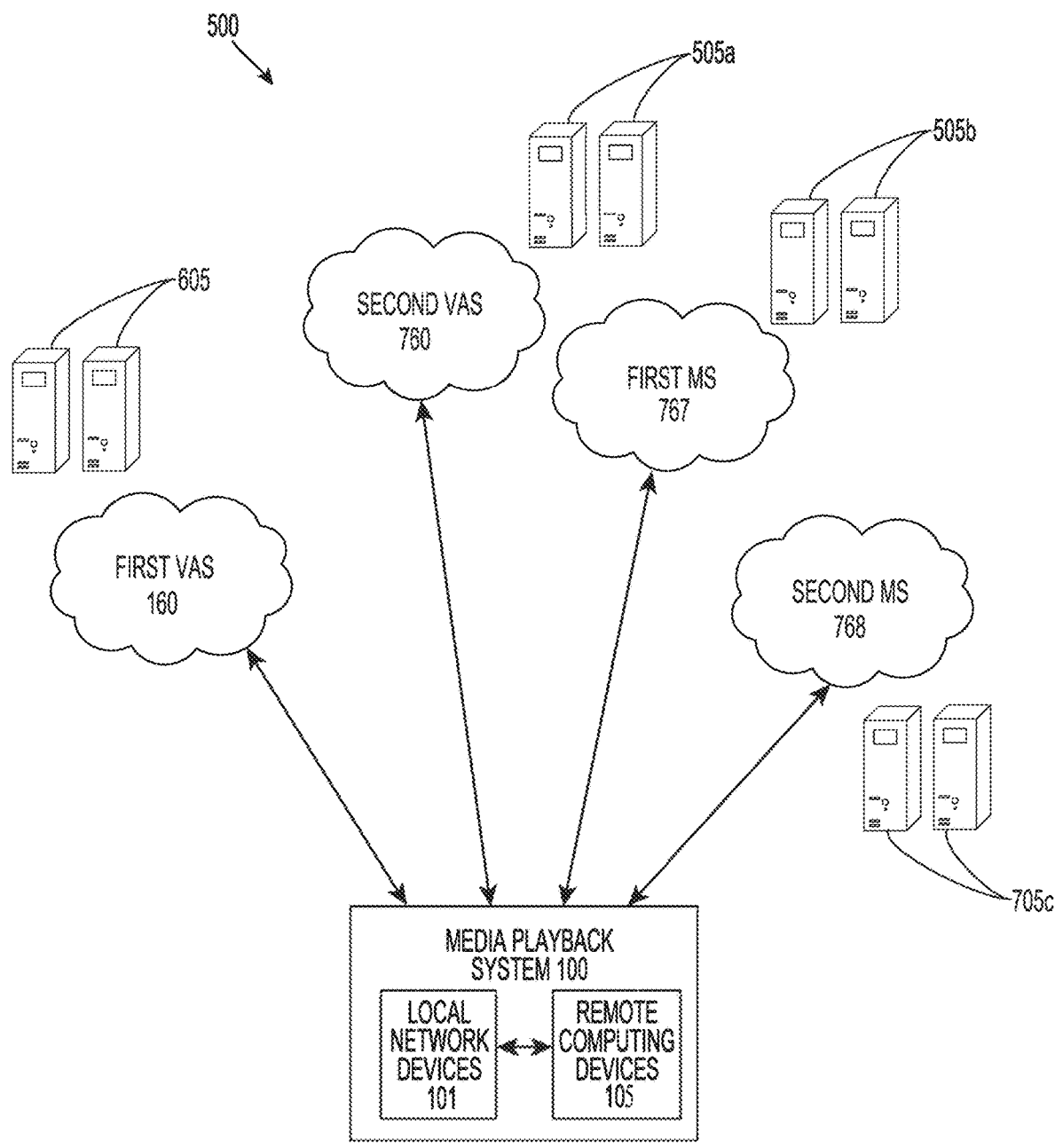
FIG. 5 is a schematic diagram of an example network system in accordance with aspects of the disclosure.

FIG. 5 is schematic diagram of an example network system 500 that comprises a media playback system 100 coupled to a first VAS 160 and to a second VAS 560. Examples of these VASes include AMAZON's Alexa®, APPLE's Siri®, MICROSOFT's Cortana®, GOOGLE's Assistant, etc. The system 100 is also coupled to a first media service provider 567 and a second media service provider 568. Examples of these media service providers include iTunes®, SPOTIFY®, PANDORA®, etc. In some embodiments, the media playback system 100 may be coupled to more or fewer VASes (one, three, four, five, six, etc.) and/or more or fewer media service providers (one, three, four, five, six, etc.). The network system 500 further includes one or more first, second, third, and fourth remote computing device(s) 505a-d (e.g., cloud servers) associated with the first VAS 160, the second VAS 560, the first media service 567, and the second media service 568, respectively.

The media playback system 100 may be coupled to the first and second VASes 160, 560 and/or the first and second media service providers 567, 568 (and/or their associated remote computing devices 505a-505d) via a WAN (such as WAN 107 in FIG. 1) and/or a LAN connected to the WAN 107. In this way, the various local network devices 101 of the media playback system 100 and/or the one or more remote computing devices 111 of the media playback system 100 may communicate with the remote computing device(s) of the first and second VASes 160, 560 and the first and second media service providers 567, 568.

III. Example Content Rules Engine

As noted previously, the ability of a media playback system to receive audio content from a variety of different sources poses certain challenges, as different audio content may present different requirements for playback devices. For example, "live" audio such as that being output from a musical instrument may require playback with very low latency. In this instance, it may be desirable to exclude playback of such live audio content on any playback devices that are not capable of meeting this low-latency requirement. To address this and other problems, a content rules engine can employ a variety of rules that restrict playback of audio content depending on the associated content source properties. Examples of content source properties include input source (e.g., SPOTIFY®, a guitar, a television, data received over a 5G connection, etc.), input type (e.g., buffered audio, live audio, doorbell, smoke alarm, VR home theatre), encoding format (e.g., HTTP Live Stream (HLS), MP3, etc.), bitrate, and user-specific tags (e.g., user's account is tagged as a Metallica fan). Examples of playback device characteristics include hardware components (e.g., on-board radio, processing power, device model, transducers, etc.), device configuration (e.g., firmware version, grouping status (e.g., bonded or merged with other devices), device location, network connection (ethernet vs. wireless), etc.), time of day, etc. When a media playback system or an individual playback device receives a request to play back particular audio content, the system can receive both the audio content as well as one or more associated content source properties. Based on these content source properties, the content rules engine can restrict playback on one or more of the playback devices. The restriction(s) will depend on the device characteristics of individual playback devices as well as the content source properties. This restriction can take a variety of forms, for example, precluding playback on a given device, limiting the total number of playback devices that can be grouped together to play back the requested audio content, or precluding formation of a synchrony group that includes particular playback devices. In some embodiments, the restriction can be used to modify an interface provided to a user (e.g., user interface 440 of the control device 104, user interface 236 of the playback device 102, etc.). For example, if a particular device or group is precluded from playing back selected audio content, then when a user selects a device or group for playback (e.g., via user interface 440 of the control device 104), those precluded devices or groups can be omitted from the displayed list of devices available for playback. In some embodiments, the precluded devices may still be graphically presented to a user (e.g., via user interface 440), but if a user selects a precluded device or group for playback, the device or group will not be allowed to play back the audio and the user may be provided with an error message or other indication via the interface 440 that the selected playback is not permitted. Although specific content source properties, playback characteristics, and playback restrictions are enumerated above, in other embodiments there may be additional or alternative content source properties, playback device characteristics, and/or playback restrictions employed by a content rules engine.

In various embodiments, the content rules engine can run on one or more playback devices 102, one or more control devices 104, and/or one or more of the remote computing device(s) 105 (FIG. 1). For example, the content rules engine can be stored in memory 216 of the playback device 102 (FIG. 2A), in memory 416 of the control device 104 (FIG. 4), and/or in memory associated with any one of the remote computing devices 505a-d (FIG. 5). As discussed in more detail below, the content rules engine can also interact with state tables that maintain and update a record of restrictions associated with particular playback devices. Such state tables can likewise be stored in memory of individual playback devices (e.g., memory 216 of FIG. 2A), control devices (e.g., memory 416 of FIG. 4), and/or in memory associated with any one of the remote computing devices 505a-d (FIG. 5).

FIGS. 6A-9B illustrate various example playback restrictions and corresponding state tables generated by a content rules engine in accordance with aspects of the disclosure. Referring to FIG. 6A, the received audio content has associated content source properties including input type: live audio, a latency requirement of less than 25 ms, and an encoding type of HTTP Live Streaming (HLS). This audio content might be, for example, input from one of the local external devices 109 (FIG. 1), such as a guitar that has an adapter or dongle configured to transmit audio content over the LAN to the media playback system 100. Based on these content source properties, playback is restricted such that the maximum number of playback devices that can be joined in a synchrony group is three, and playback is limited to devices with dedicated 5 GHz radios and that are HLS-compatible. These are example restrictions that can be enforced by the content rules engine in response to the particular content source properties in FIG. 6A in order to maintain satisfactory performance of the media playback system in playing back the particular audio content. Preventing playback on devices without 5 GHz radio (which may lead to increased latency) can help ensure satisfactory playback of the live audio content.

FIG. 6B illustrates a corresponding state table, in which the restricted or non-restricted status of one or more playback devices are stored and updated on an ongoing basis. For example, as shown in FIG. 6B, Playback Devices 2, 5, and 6 are restricted such that playback is not permitted. These devices might be, for example, devices that do not have a 5 GHz radio (for example, older devices having only 2.4 GHz radios), or devices that are not HLS-compatible. As a result, the content rules engine does not permit playback on these devices. Meanwhile, Playback Devices 1, 3, and 4 are permitted to play back the audio content, but they are limited to a synchrony group having a maximum of three playback devices. Limiting the total number of devices in a synchrony group can provide improved performance in circumstances in which a greater number of playback devices can lead to "dropout" in which certain devices cease to play back the audio content unexpectedly. In this instance, even if there were additional playback devices that included a 5 GHz radio and were HLS-compatible, the content rules engine would not permit such additional devices to join the synchrony group of Playback Devices 1, 3, and 4 in order to maintain satisfactory performance in playing back the live audio content.

Once the media playback system is no longer receiving the audio content having the associated content source properties shown in FIG. 6A, the state table shown in FIG. 6B can be updated to remove the playback restrictions from those playback devices previously restricted by the content rules engine. For example, if, after the live audio content is no longer being played back via the media playback system, the media playback system instead begins streaming SPOTIFY®, the state table as shown in FIG. 6B can be updated to remove all restrictions, including allowing playback via Playback Devices 2, 5, and 6, and by not limiting the maximum number of playback devices that may join a synchrony group.

Another example of playback restriction based on content source properties is shown in FIG. 7A, in which the audio content has an associated content property of an explicit content tag. Based at least in part on this content source property, the content rules engine restricts playback by not permitting playback on any devices located in "kid's room." As seen in FIG. 7B, the state table reflects that Playback Device 1, which is located in a child's room, is restricted from playing back the content due to the presence of the explicit content tag. Meanwhile, Playback Devices 2, 3, and 4 are not restricted and playback is permitted. These devices can be located in areas other than a child's room, and so are unaffected by the restrictions of the content rules engine. As noted above, the content rules engine can periodically or continuously update the state table, such that once the incoming audio does not have the content source property of having an explicit tag, playback can be permitted on Playback Device 1, and the associated restriction can be removed from the state table.

With reference to FIG. 8A, the incoming audio has an associated content source property of "input type: doorbell," indicating that the audio corresponds to a doorbell chime. Based on this content source property, the content rules engine restricts playback such that the doorbell chime is not played back on any devices located in a bedroom, and is not played back on any devices during the specified hours of 10 pm to 6 am. The state table shown in FIG. 8B illustrates the corresponding restrictions, in which Playback Devices 1 and 2, which are located in bedrooms, are restricted such that playback is not permitted. Meanwhile, playback is permitted for Playback Devices 3 and 4, but only during specified time periods. This can permit, for example, a doorbell to not be played in bedrooms at any time (so as not to wake anyone while asleep), while excluding a doorbell chime from being played on any devices during the specified time intervals. Meanwhile, this restriction need not extend to other audio types, thereby allowing, for example, a smoke alarm signal to be played back on all playback devices and at any time of day.

FIG. 9A illustrates yet another example of a content rules engine providing playback restrictions based on content source properties associated with received audio input. In this example, the audio content has an input type of virtual reality (VR) home theatre. Because VR home theatre content requires very low latency and high quality for satisfactory user experience, it can be advantageous to limit playback to devices having very high bandwidth connections such as a wired LAN connection. Additionally, to avoid deleterious "dropout" effects, it can be advantageous to limit a maximum grouping of playback devices. Accordingly, the content rules engine restricts playback devices to allow only devices having a LAN connection and limits the maximum number of playback devices forming a synchrony group to four. FIG. 9B illustrates the corresponding state table, in which Playback Devices 1-4 are permitted to play back the VR home theatre content, and can be grouped to a total of four devices. In this example, these devices each are equipped with a hardwired LAN connection (e.g., an ethernet cable), for example, forming a home theatre setup. Meanwhile, the content rules engine does not permit playback on Playback Devices 5 and 6. For example, these devices may be configured with only a wireless network connection, and so are not permitted to play back VR home theatre content. In some embodiments, the restriction can take the form of precluding the formation of a synchrony group that includes the restricted devices such as Playback Devices 5 and 6.

Figure 10:
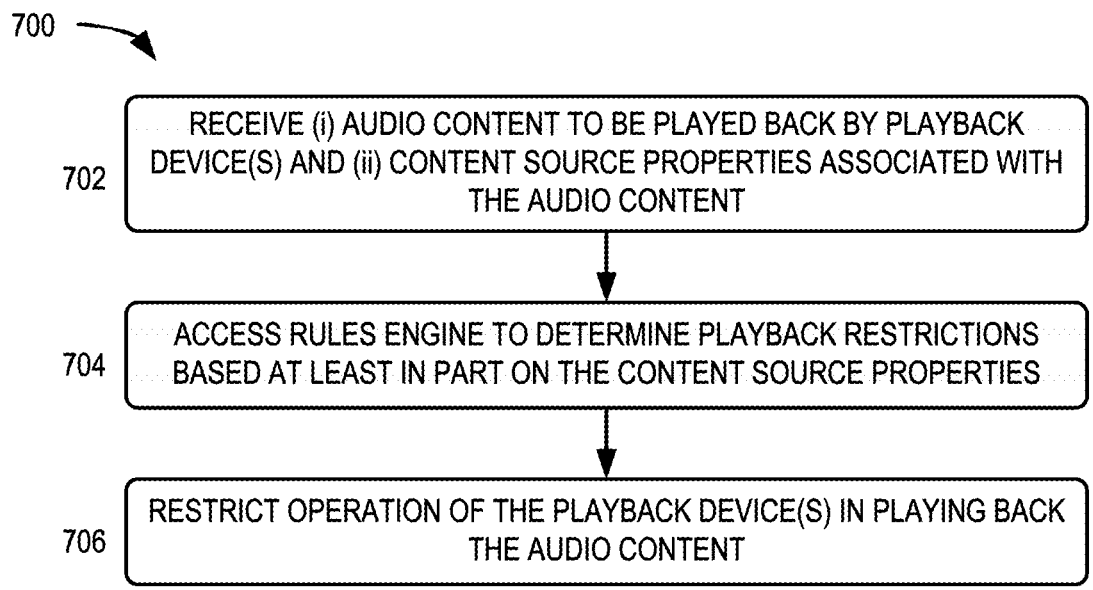
FIG. 10 is a flow diagram of a method of restricting playback on one or more playback devices via a content rules engine in accordance with aspects of the disclosure.

FIG. 10 is a flow diagram of a method of restricting playback on one or more playback devices via a content rules engine in accordance with aspects of the disclosure. The process 1000 begins in block 1002 with receiving both (i) audio content to be played back by one or more playback devices and (ii) content source properties associated with the audio content. For example, the audio content can be received from local external devices (e.g., piano 109a in FIG. 1) or over a network from a remote audio content source (e.g., first media service provider 567 in FIG. 5). The audio content can have associated content source properties as noted above. These content source properties can be transmitted from the content source along with the audio content, either concurrently or sequentially.

The process 1000 continues in block 1004 with accessing a rules engine to determine playback restrictions based at least in part on the content source properties. For example, the content rules engine can specify that audio content having certain associated content source properties may only be played back on a predetermined maximum number of devices (e.g., played back on no more than three playback devices), on devices having certain hardware characteristics (e.g., only played back on devices having a 5 GHz radio or on devices coupled to a hardwired LAN connection), on devices having certain functional capabilities (e.g., only played back on devices that support a particular encoding format, bit rate, etc.), or on devices having other specified characteristics (e.g., device location).

In some embodiments, accessing a rules engine can include transmitting a request to a remote computing device that includes the associated content source properties of the audio content received at a particular playback device. In response to the request, the remote computing device can access the rules engine to determine any applicable playback restrictions, and transmit these restrictions to the playback device. In some embodiments, the remote computing device provides state information corresponding to the playback restrictions to the playback device. The playback device can maintain a state table corresponding to present playback restrictions and can update the state table on an ongoing basis upon receiving state information from the remote computing device. In other embodiments, accessing the rules engine can be performed locally on one or more playback devices without requiring the request to be transmitted to a remote computing device.

In block 1006, the process restricts operation of the playback device(s) in playing back the audio content. For example, as shown in FIGS. 6A-9B, the restriction can preclude one or more playback devices from playing back audio having the associated content source properties. In some embodiments, the restriction can include precluding formation of a synchrony group that includes the restricted playback device. For example, a media playback system may receive a first command to form a synchrony group that includes a plurality of playback devices, followed by a request to play back first audio content via the synchrony group. The media playback system may then play back the first audio content via the synchrony group. When the media playback system later receives second audio content that has associated content source properties, the media playback system can access a rules engine to determine playback restrictions based on the content source properties. Based on the playback restrictions, the media playback system may restrict operation of one or more of the playback devices, for example, by precluding formation of the synchrony group.

In some embodiments, the process can further determine that the playback device is no longer receiving the audio content having the associated content source properties that resulted in the playback restriction. In this instance, the playback device can update the state table to remove the playback restrictions from the one or more playback devices previously restricted by the content rules engine.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner. Example 1: a method comprising: receiving, via a media playback system, a first command to form a synchrony group comprising a plurality of playback devices, wherein each playback device of the synchrony group is configured to play back audio content in synchrony with one another; receiving, via the media playback system, a second command for the synchrony group to play back first audio content; in response to the second command, playing back, via the synchrony group, the first audio content; receiving, via the media playback system, (i) second audio content to be played back by one or more of the playback devices of the plurality of playback devices and (ii) content source properties associated with an audio source of the second audio content; accessing a rules engine to determine playback restrictions, the playback restrictions based on the content source properties; and based at least in part on the determination of the playback restrictions, restricting, via the media playback system, operation of the one or more playback devices, the restricting comprising precluding formation of the synchrony group. Example 2: the method of Example 1, wherein the media playback system further comprises a remote computing device, and wherein the accessing comprises, via at least one of the playback devices of the plurality of playback devices: transmitting a request to the remote computing device, wherein the request comprises the content source properties; and in response to the request, receiving state information corresponding to the playback restrictions. Example 3: the method of Example 2, further comprising maintaining a state table and updating the state table based on the state information. Example 4: the method of Example 3, further comprising (i) determining that the at least one of the playback devices of the plurality of playback devices is no longer receiving audio content from the audio content source and (ii) updating the state table to remove the playback restrictions from the one or more playback devices. Example 5: the method of Example 3, wherein the maintaining comprises associating limitations to the media playback system for a given content source that is to provide audio content for playback, wherein the limitations comprise at least one of (i) a maximum number of playback devices that may be grouped for the given content source and (ii) an indication of whether playback devices may be paired to one another for the given content source. Example 6: The method of any one of Examples 1-5, wherein the synchrony group is a first synchrony group, wherein the first synchrony group comprises a first playback device, a second playback device, and a third playback device, and wherein the method further comprises while restricting the operation of the one or more playback systems: receiving, via the media playback system, a third command to form a second synchrony group, wherein the second synchrony group comprises the first and second playback devices but not the third playback device; after receiving the third command, forming the second synchrony group; and playing back the second audio content via the second synchrony group. Example 7: the method of any one of Examples 1-6, wherein the playback device characteristics comprise at least one of: radio type, processing power, device model, transducers, firmware version, grouping status, device location, network connection, time of day, or any combination thereof. Example 8: the method of any one of Examples 1-7, wherein the source content properties comprise at least one of: input source, input type, encoding format, bitrate, user-specific tags, or any combination thereof. Example 9: the method of any one of Examples 1-8, further comprising providing a user notification of the restriction of the operation of the one or more playback devices.

Example 10: a non-transitory computer-readable medium comprising instructions for identifying aberrant microphone behavior, the instructions, when executed by a processor, causing the processor to perform the method of any of Examples 1-9. Example 11: a playback device comprising one or more processors; and a computer-readable medium storing instructions that, when executed by the one or more processors, cause the playback device to perform operations comprising the method of any of Examples 1-9.

The invention claimed is:

1. A playback device comprising:
one or more audio transducers;
one or more processors; and
a computer-readable medium storing instructions that, when executed by the one or more processors, cause the one or more processors to perform operations comprising:
receiving a command to play back first audio content;
in response to the command, playing back, via the one or more audio transducers, the first audio content;
receiving (i) second audio content to be played back by the playback device and (ii) content source properties associated with an audio source of the second audio content;
determining playback restrictions based on the content source properties, wherein the determining comprises receiving, at the playback device, playback restrictions information from one or more remote computing devices; and
based at least in part on the determination of the playback restrictions, restricting operation of the playback device.

2. The playback device of claim 1, wherein restricting operation of the playback device comprises precluding playback of the second audio content.

3. The playback device of claim 1, wherein restricting operation of the playback device comprises precluding formation of a synchrony group with one or more additional playback devices.

4. The playback device of claim 1, wherein the operations further comprise (i) determining that the playback device is no longer receiving audio content from the audio content source and (ii) removing the playback restrictions from the playback device.

5. The playback device of claim 1, wherein the operations further comprise maintaining a state table associating playback limitations for a given content source that is to provide audio content for playback, wherein the limitations comprise at least one of (i) a maximum number of playback devices that may be grouped for the given content source or (ii) an indication of whether playback devices may be paired to one another for the given content source.

6. The playback device of claim 1, wherein the content source properties comprise at least one of: input source, input type, encoding format, bitrate, user-specific tags, or any combination thereof.

7. The playback device of claim 6, wherein the content source properties comprise an input type including one or more of: home theatre audio, virtual reality (VR) home theatre, line-in audio, or live audio.

8. A method comprising:
receiving, via a media playback system comprising a playback device and one or more remote computing devices, a command for the playback devices to play back first audio content;
in response to the command, playing back, via the playback device, the first audio content;
receiving, via the media playback system, (i) second audio content to be played back by the playback device and (ii) content source properties associated with an audio source of the second audio content;
determining playback restrictions based on the content source properties, wherein the determining comprises receiving, at the playback device, playback restrictions information from the one or more remote computing devices; and
based at least in part on the determination of the playback restrictions, restricting, via the media playback system, operation of the playback device.

9. The method of claim 8, wherein restricting operation of the playback device comprises precluding playback of the second audio content.

10. The method of claim 8, wherein restricting operation of the playback device comprises precluding formation of a synchrony group with one or more additional playback devices.

11. The method of claim 8, further comprising (i) determining that the playback device is no longer receiving audio content from the audio content source and (ii) removing the playback restrictions from the playback device.

12. The method of claim 8, further comprising maintaining a state table associating playback limitations for a given content source that is to provide audio content for playback, wherein the limitations comprise at least one of (i) a maximum number of playback devices that may be grouped for the given content source or (ii) an indication of whether playback devices may be paired to one another for the given content source.

13. The method of claim 8, wherein the content source properties comprise at least one of: input source, input type, encoding format, bitrate, user-specific tags, or any combination thereof.

14. The method of claim 13, wherein the content source properties comprise an input type including one or more of: home theatre audio, virtual reality (VR) home theatre, line-in audio, or live audio.

15. A non-transitory computer-readable medium comprising instructions that, when executed by one or more processors, cause the one or more processors to perform operations comprising:
- receiving a command for a playback device to play back first audio content;
- in response to the command, playing back, via the playback device, the first audio content;
- receiving (i) second audio content to be played back by the playback device and (ii) content source properties associated with an audio source of the second audio content;
- determining playback restrictions based on the content source properties, wherein the determining comprises receiving, at the playback device, playback restrictions information from one or more remote computing devices; and
- based at least in part on the determination of the playback restrictions, restricting operation of the playback device.

16. The computer-readable medium of claim 15, wherein restricting operation of the playback device comprises precluding playback of the second audio content.

17. The computer-readable medium of claim 15, wherein restricting operation of the playback device comprises precluding formation of a synchrony group with one or more additional playback devices.

18. The computer-readable medium of claim 15, wherein the operations further comprise (i) determining that the playback device is no longer receiving audio content from the audio content source and (ii) removing the playback restrictions from the playback device.

19. The computer-readable medium of claim 15, wherein the operations further comprise maintaining a state table associating playback limitations for a given content source that is to provide audio content for playback, wherein the limitations comprise at least one of (i) a maximum number of playback devices that may be grouped for the given content source or (ii) an indication of whether playback devices may be paired to one another for the given content source.

20. The computer-readable medium of claim 15, wherein the content source properties comprise at least one of: input source, input type, encoding format, bitrate, user-specific tags, or any combination thereof.

* * * * *